United States Patent [19]
Bohlen et al.

[11] Patent Number: 5,340,331
[45] Date of Patent: Aug. 23, 1994

[54] CABLING ARRANGEMENT

[76] Inventors: Hans-Dieter Bohlen, Hauptstrasse 39 a, 3171 Osloss; Manfred Starchikow, Rosenweg 8, 3178 Calberlah, both of Fed. Rep. of Germany

[21] Appl. No.: 806,868

[22] Filed: Dec. 12, 1991

[30] Foreign Application Priority Data

Dec. 19, 1990 [DE] Fed. Rep. of Germany ....... 4040610

[51] Int. Cl.⁵ ............................................. H01R 11/00
[52] U.S. Cl. ..................................... 439/502; 439/624
[58] Field of Search ........ 439/502, 505, 638, 650–655, 439/623, 624; 174/72 R, 72 A, 71 R, 254; 361/398

[56] References Cited

U.S. PATENT DOCUMENTS

| | | | |
|---|---|---|---|
| 2,933,550 | 4/1960 | Cole | 439/624 |
| 3,123,428 | 3/1964 | McKee | 439/651 |
| 3,325,765 | 6/1967 | Hart et al. | 439/624 |
| 3,510,825 | 5/1970 | Quackenbush | 439/650 |
| 3,984,622 | 10/1976 | Ross | 174/72 A |
| 4,000,558 | 1/1977 | Cahill | 174/254 |
| 4,227,764 | 10/1980 | Fiske | 439/638 |
| 4,362,905 | 12/1982 | Ismail | 439/676 |
| 4,545,632 | 10/1985 | Maier et al. | 439/43 |
| 4,950,171 | 8/1990 | Muzslay | 361/398 |
| 4,971,576 | 11/1990 | Thimmesch | 439/502 |
| 4,974,121 | 11/1990 | Masuko et al. | 361/398 |

FOREIGN PATENT DOCUMENTS 1803571 11/1959 Fed. Rep. of Germany .
1291811 4/1969 Fed. Rep. of Germany .

*Primary Examiner*—Neil Abrams
*Attorney, Agent, or Firm*—Meltzer, Lippe, Goldstein et al.

[57] ABSTRACT

The invention relates to a cabling arrangement with multi-lead cables and multi-pole plug-in units for connecting terminals of a central terminal box to the contacts of at least two adjoining multi-pole contact units of electrically controlled actuators. Each of the multi-pole contact units is provided with a ground contact and/or safety contact and at least one control contact. In order to reduce the expenditure in cables and to improve accessibility of the cables with respect to failure detection, a multi-lead main cable going from the central terminal box to the first contact unit is provided, containing a number of control conductors corresponding to the number of control contacts of the multi-pole contact units as well as a common ground conductor and/or a common safety conductor. A multi-pole plug-in unit is provided for connecting the contacts of the first contact unit with the respective ground and/or safety conductors as well as the appertaining control conductors of the main cable. The remaining control conductors as well as the ground and/or safety conductor of the main cable are connected by means of at least one multi-lead distributor cable to the other multi-pole contact unit(s).

5 Claims, 4 Drawing Sheets

CABLING ARRANGEMENT

FIELD OF THE INVENTION

The instant invention relates to a multi-pole cabling arrangement containing plug-in units and multi-wire cables for the establishment of electrical conducting connections between ground, safety and control contacts of two or more multi-pole contact units and corresponding contacts of a central control or switching box.

BACKGROUND OF THE INVENTION

Modern plants and manufacturing facilities use a great number of electrically or electromagnetically controlled (most often hydraulic and/or pneumatic) actuators in their operation.

These actuators are generally provided with multi-pole contact units, each with a ground contact, and if required by regulation, with a safety contact and at least one control contact over which the control signals are transmitted for the control of the actuator.

Each of the multi-pole contact units is in this case connected electrically via a multi-wire cable to a central control or switching box from which they are supplied with the necessary control signals in accordance with applicable plant control or regulating requirements. The multi-lead cables are then generally connected to the multi-pole contact units assigned to them by means of corresponding multi-pole plug units.

Long cable sections which have to be laid over great distances to the central terminal box or central control or switching box are necessary, especially if several such multi-pole contact units are installed. In modern manufacturing plants for motor vehicles assembly, for example, two multi-pole contact units are provided for each one of sometimes 10,000 or more actuating and control units. In such plants, an extraordinary amount of cabling is therefore used and extraordinary costs pertaining to the central terminal box or to the central control or switching box are involved.

Failure detection within the cabling arrangement is difficult and time consuming because of the multitude of lines and line connections, especially when such production plants are started up or re-started.

Against this background, it is the object of the instant invention to reduce the overall expenditure for such cabling, to improve the accessibility of the cabling and to facilitate failure detection.

SUMMARY OF THE INVENTION

These and other objects are attained by the instant invention.

According to the instant invention the multi-point contact units of the different actuators, distributing valves etc. which are generally equipped with a ground contact for connection to a ground conductor in addition to one or several control contacts and generally with an additional safety contact for connection to a safety line are no longer connected as usually via individual multi-lead cables to the terminals of a further distant central terminal box or central control or switching box. Rather, adjoining, i.e., multi-pole contact units of the different actuators, etc., located in close proximity of each other by comparison to their distance from the central terminal box, are connected by means of a common multi-lead main cable which bridges the comparatively great distance between the central terminal box and this group of multi-pole contact units and, depending on the number of participating multi-pole contact units, the contract units of one or several multi-lead distribution cables are connected to the appertaining terminals of the central terminal box or similar device.

Instead of n comparatively long individual cables, each with m+2 leads (m control conductors, one ground conductor and one safety conductor), only one long main cable with m x n+2 leads as well as one or two short distribution cables with m+2 leads are now required.

It can be readily seen that the expenditure in cables is thus considerably reduced. For example, if two adjoining three-pole contact units are connected by cable in this manner to a distant central terminal box, the required expenditure in cable is reduced by approximately one third. Now essentially only one four-lead main cable is needed instead of two long three-lead individual cables because a common ground conductor and a common safety conductor can be used in this case. But it is not only the expenditure in cables which is reduced. Also, the expenditures for the terminal box are reduced because part of the terminals otherwise required for ground conductors and safety conductors can be omitted. Also, the accessibility of the cabling and of the terminal box connections is improved significantly, and this is a very positive factor at start-up and during subsequent maintenance of the plant as well as for failure detection that may be required.

BRIEF DESCRIPTION OF THE DRAWINGS

The invention is explained in greater detail through several embodiments shown in part schematically in the drawings.

In the drawings.

DETAILED DESCRIPTION OF THE INVENTION

Figure 1:
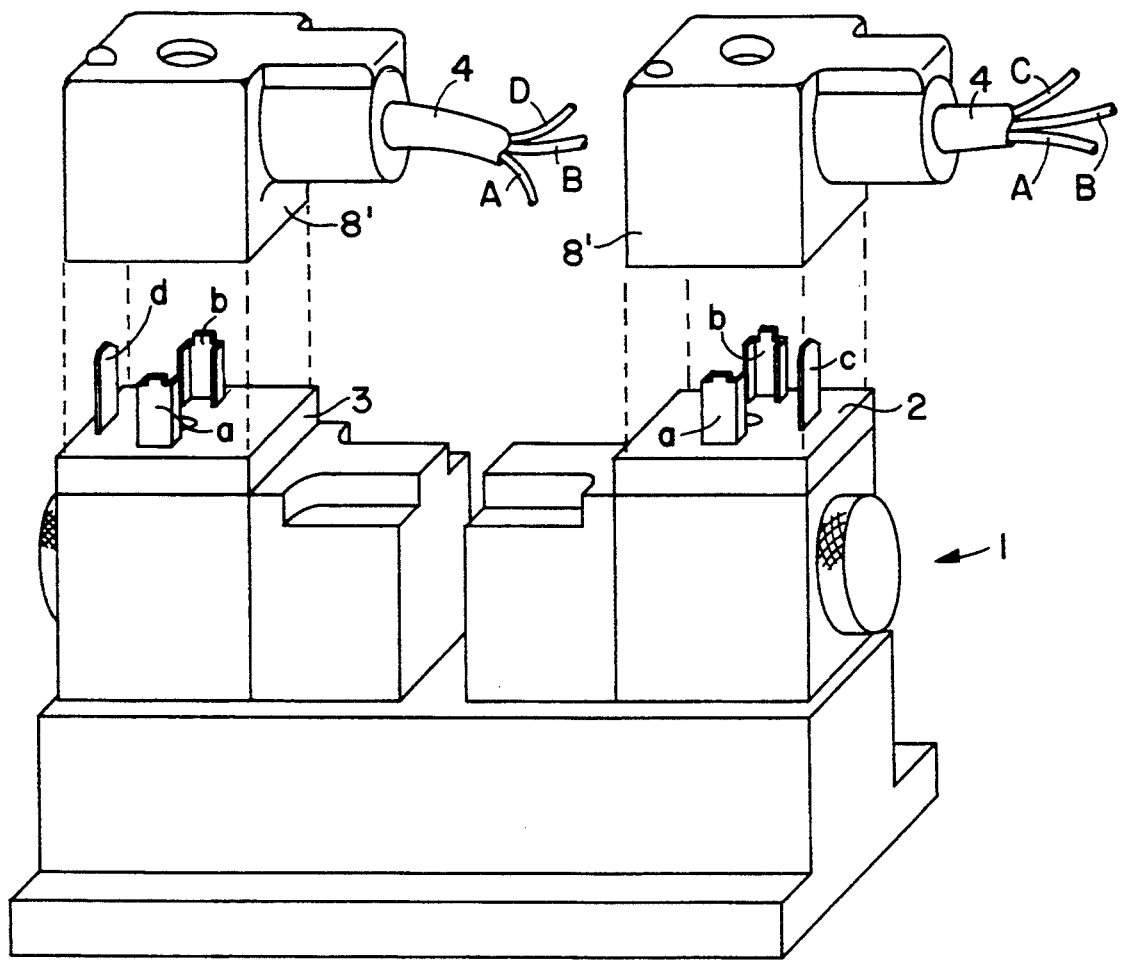
FIG. 1 shows an electrically controlled actuator with two multi-pole contact units cabled in the conventional manner.

Referring to FIG. 1, an electronically controlled actuator 1 according to the prior art, such as an electromagnetically controlled hydraulic or pneumatic distributing valve, is provided for its control with two three-pole contact units 2 and 3 which are at a comparatively short distance from each other. Each of the two contact units 2, 3 is provided with a ground contact a for connection to a ground conductor, a safety contact b for connection to a safety conductor and a control contact c or d for connection to a control conductor over which the required electrical control signals are transmitted. In variance with the embodiment shown it is in principle also possible to provide more than only one such control contact.

The two multi-pole contact units 2, 3 are connected in a conventional cabling arrangement via a multi-lead cable 4 to the terminals of a central terminal box located at a greater distance, and not shown here, or to a central control or switching box. Depending on the number of contacts of the two contact units 2, 3, the two individual cables 4 contain three leads, i.e., a ground conductor A, a safety conductor B and a control conductor C or D. To produce the electrically conductive connection between the contacts of the two contact units 2, 3 and the conductors of the multi-lead cable 4, the latter are provided with plug-in units 8' which are plugged into the contact units.

To produce the electrically conductive connection between the contacts of the two contact units 2, 3 and the central terminal box, cables with a total of six leads as well sa six connection terminals in the terminal box are required with a conventional cabling arrangement.

Figure 2:
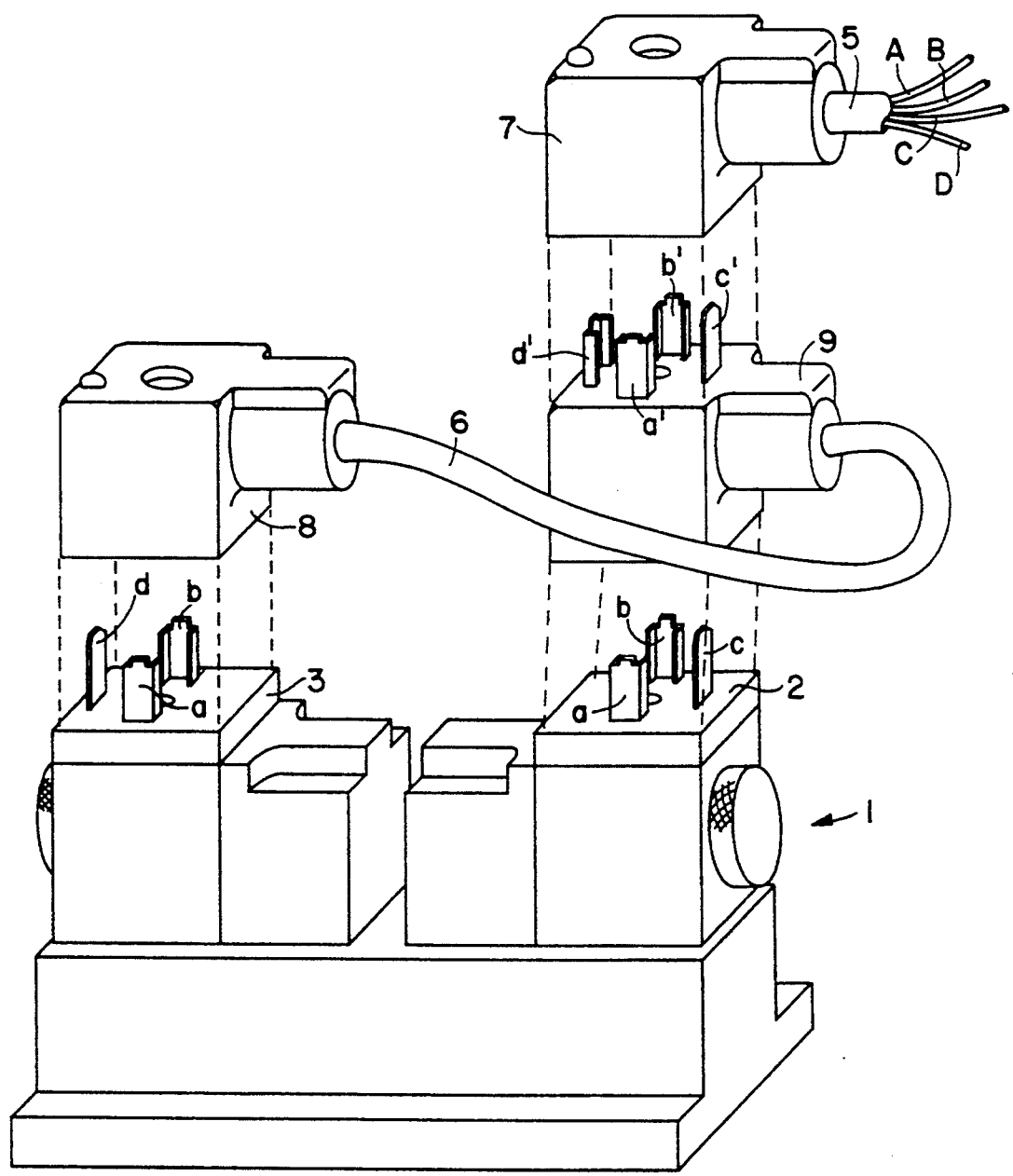
FIG. 2 shows the same electrically controlled actuator with cabling according to the invention.

In an embodiment of the invention according to FIG. 2, an identical electrically controlled actuator 1 comprising two three-pole contact units 2, 3 with ground contacts a, safety contacts b and control contacts c, d is shown. In this case the cabling according to the invention is realized by means of, a multi-lead main cable 5 to cover the comparatively greater distance between the central terminal box or central control or switching box (which is not shown here) and the actuator 1 or the first three-pole contact unit 2 of this actuator, as well as by means of a multi-lead distributor cable 6 which leads from the first contact unit 2 to the second contact unit 3.

In the main cable 5, a number of control conductors C, D equal to the number of control contacts c, d of the two three-pole contact units 2, 3 as well as a common ground conductor A and a common safety conductor B are joined together. The main cable 5 in this embodiment is therefore designed with two contact units each of which has three contacts, i.e., as a four-lead cable.

An electrically conductive connection between the three contacts a, b, c of the first contact unit 2 and the three appertaining conductors A, B, C of the main cable 5, i.e., between the ground contact a and the ground conductor A, the safety contact b and the safety conductor B and between the control contact c and the control conductor C, is established via multi-pole plug-in unit 7 and an adapter-like plug-in unit 9 (discussed further below).

The electrically conductive connection between the three contacts a, b, d of the second contact unit 3 and the appertaining conductors A, B, D of the main cable 5 are established by means of the three-lead distributor cable 6 going from the first contact unit 2 to the second contact unit 3. This cable 6 is provided on one end with a three-pole plug-in unit 8 capable of being plugged into the second contact unit 3 and on the other end with an adapter-like plug-in unit 9 capable of being plugged into the first contact unit 2, whereby the four-pole plug-in unit 7 of the main cable 5 is capable of being plugged in turn into the plug-in unit 9.

Figure 4:
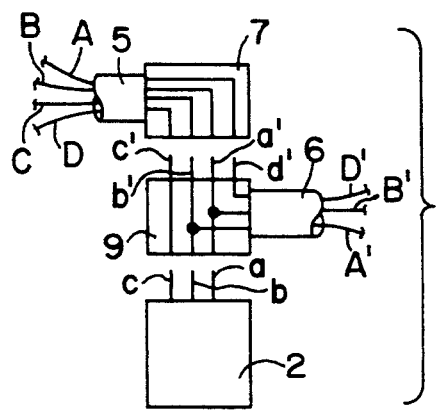
FIG. 4 shows a schematic diagram of the cabling according to the invention shown in FIG. 2 and FIGS. 5 and 6 show schematic diagrams of two additional variants of the cabling according to the invention.

The adapter-like plug-in unit 9 of the distributor cable 6 supports on one side the contacts or contact sleeve, not shown here, corresponding to the three contacts a, b, c of the first contact unit 2, and on the other side four contacts a', b', c', d' corresponding to the appertaining contacts or contact sleeves, not shown here, of the plug-in unit 7 of the main cable 5. Thus an electrically conductive connection is established by means of the adapter-like plug-in unit 9 of the distributor cable 6 on the one hand (via contacts a', b', c', an electrically conductive connection between the three contacts a, b, c of the first contact unit 2 and the appertaining conductors A, B and C of the main cable 5) and on the other hand, via contacts a', b', d', an electrically conductive connection between the three conductors of the distributor cable 6 going to the three contacts a, b, d of the second contact unit 3 and the appertaining conductors A, B and D of the main cable 5. In FIG. 4 which shows this embodiment in a diagram, these conductor bifurcations within the adapter-like plug-in unit 9 can clearly be recognized.

Figure 3:
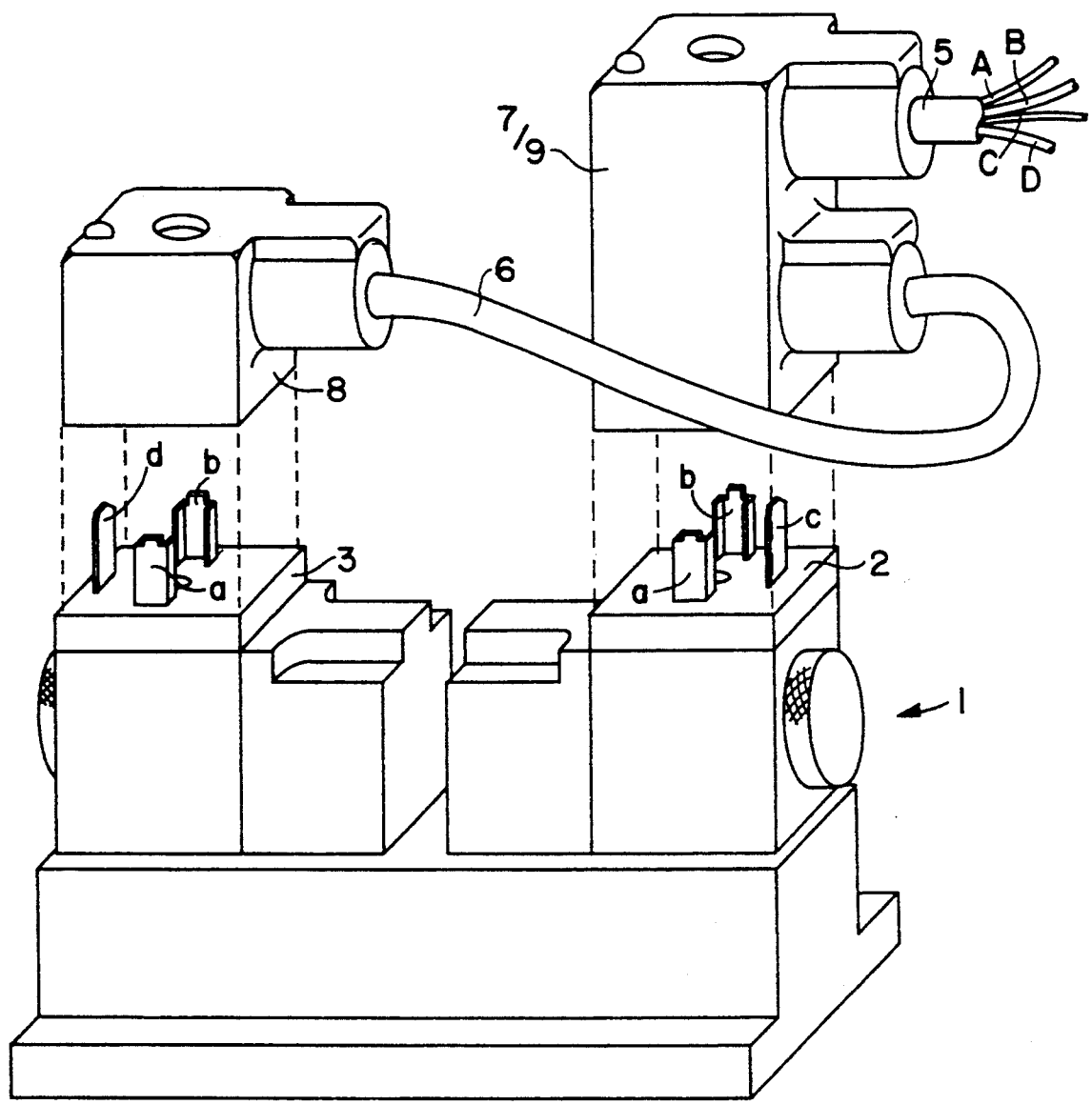
FIG. 3 shows the same actuator with a slightly different cabling according to the invention.

FIG. 3 shows an embodiment of the cabling arrangement according to the invention which is substantially the same as the embodiment shown in FIG. 2. The same parts are therefore again given the same reference numbers.

While the main cable 5 with its plug-in unit 7, and the distributor cable 6 with its plug-in units 8, 9 are distinct and discrete components in the embodiment shown in FIG. 2, the main cable 5, the distributor cable 6 and the plug-in units 7,8, 9 in the embodiment shown in FIG. 3 are combined in a one-piece unit, as this can be advantageous in some instances. In general however, the design shown in FIG. 2 would be preferred in use because it finally offers greater flexibility in configuration and makes it possible to use standardized main cables.

The embodiment variants of the cabling arrangement according to the invention for only two adjoining multi-pole contact units, e.g., 2 and 3 shown in FIGS. 2 and 3, would probably be used most widely because electrically controlled actuators or similar devices with two multi-pole contact units in close proximity of each other are used very often in plants and industrial manufacturing facilities.

But the cabling principle according to the invention is used advantageously also where, not only two, but several multi-pole contact units, each with a ground contact and/or a safety contact, are installed in close proximity of each other and are to be connected to the terminal connections of a further distant central terminal box or similar device, and where it does not matter whether the multi-pole contact units are part of one single actuators or of different actuators or similar devices.

If more than two adjoining multi-pole contact units are to be cabled in accordance with the invention, a correspondingly greater number of distributor cables must be provided in order to establish the electrically conductive connection between the different multi-pole contact units and the appertaining conductors of the main cable coming from the central terminal box.

The distributor cables (as shown in a diagram in FIG. 5) can be laid in a star configuration from the first contact unit 2 to which the main cable 5 is laid, to the other contact units, whereby each distributor cable 6, 6' contains a ground conductor and/or a safety conductor as well as one or several control conductors, depending on the number of control contacts which are provided for the multi-pole contact unit to be connected.

Figure 6:
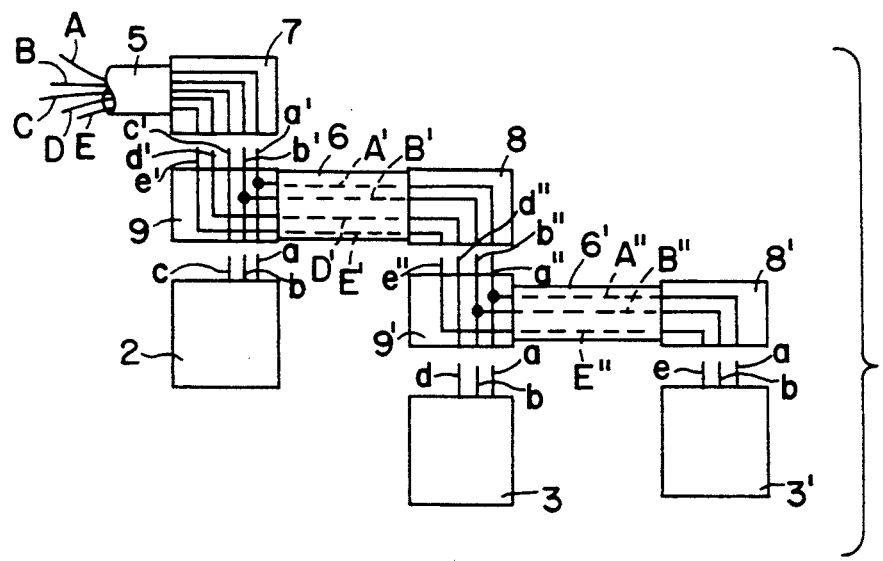

However the distributor cables can also be laid in cascade connection (as shown in the diagram of FIG. 6) from the first contact unit 2 to the other contact units 3, 3' whereby distributor cables 6, 6' connected in series one after the other in the manner of steps, each containing a ground conductor and/or safety conductor as well as a number of control conductors equal to the number of control contacts of the downstream contact units.

Figure 5:
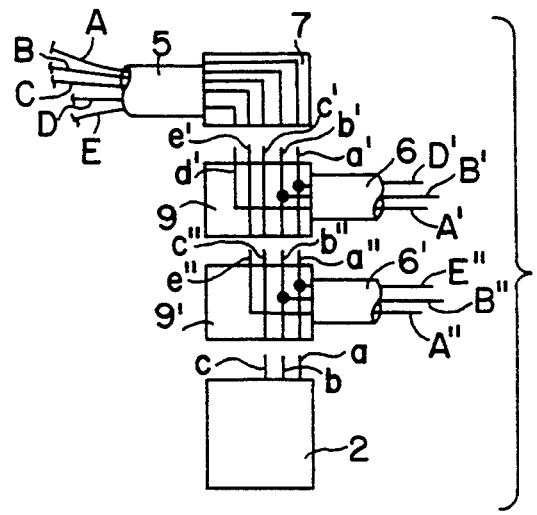

With an arrangement of the distributor cables 6, 6' in a star configuration according to FIG. 5, the adapter-like plug-in units 9, 9' of the different distributor cables 6, 6' are plugged together in a tower-like stack for connection to the main cable 5, whereby the adapter-like plug-in unit on the one end of the tower-like stack of plug-in units (plug-in unit 9 in FIG. 5) is connected to the multi-pole plug-in unit 7 of the main cable 5 and the adapter-like plug-in unit on the other end of the tower-like stack of plug-in units (plug-in unit 9' in FIG. 5) is connected to the first multi-pole contact unit 2. The adapter-like plug-in units 9, 9' are designed differently with respect to their internal, i.e., conductive structure, as well as with respect to the number of their contacts because not only the conductor connection to the control conductor of the appertaining distributor cable must be established by the adapter-like plug-in units 9 or 9' in closer proximity of the main cable 5, but also because continuous conductor connections must be created for the control conductors of each subsequent distributor cable, e.g., 6 or 6'. All adapter-like plug-in units are of course equipped with a continuous ground and/or safety conductors with their input contacts a', a" or b' and b", each with conductor bifurcations to the corresponding ground and/or safety conductors A', A" or B', B" of their appertaining distributor cable 6, 6' as well as continuous conductors connected to control contacts, e.g., c', e' or c" in different numbers for electrically conductive connection to the control conductor(s) of each following distributor cable or to the control contact(s) of the first contact unit 2.

It is clear that the number of leads in the main cable 5 increases as the number of connected multi-pole contact units increases since the total number of control contacts to be connected increases. In the embodiment according to FIG. 5, in which three adjoining three-pole contact units (of which only the first contact unit 2 is shown) are supplied, the main cable 5 has five leads; in addition to the ground and safety leads A, B there are three control leads C to E for the supply of the control contacts of the three contact units.

The embodiment according to FIG. 6 shows an arrangement in which three adjoining contact units 2, 3 and 3' are provided as in FIG. 5, each with three contacts, i.e., each with a ground contact a, a safety contact b and a control contact c or d or e.

The basic principle of this cabling variant is the same as for the other embodiments shown. A main cable 5 containing a common ground conductor A, a common safety conductor B and a total number of control conductors C to E corresponding to the number of control contacts c to e of the connected multi-pole contact units 2 to 3' covers the comparatively great distance between the central terminal box (not shown here) and the first multi-pole contact unit 2 while the additional electrical connection to the other two multi-pole contact units 3, 3' is effected by means of two distributor cables 6, 6'.

By contrast to the embodiment according to FIG. 1, the adapter-like plug-in units 9, 9' of the distributor cable 6, 6' are not plugged together in a tower-like stack and then connected together to the plug-in unit 7 of the main cable 5. Here only the adapter-like plug-in unit 9 of the first distributor cable going from the first contact unit 2 to the second contact unit 3 is plugged in between the first contact unit 2 and the plug-in unit 7 of the main cable 5, so that on the one hand a conductive connection is established between the three contacts a to c of the first contact unit 2 (via contacts a' to c') and the appertaining contacts or contact sleeves A to C of the plug-in unit 7 of the main cable 5, and on the other hand (via contacts a', b' and d', e') a conductive connection is established to the conductors of the first four-lead distribution cable 6. The adapter-like plug-in unit 9' of the second distributor cable 6 going from the second contact unit 3 to the third contact unit 3' is correspondingly intercalated between the second contact unit 3 and the four-pole plug-in unit 8 of the first distributor cable 6, so that as a result a conductive connection (via contacts a", b", d") is established on the one hand between the three contacts a, b and d of the second contact unit 3 and the appertaining contacts or contact sleeves A', B', D' of the plug-in unit 8 and on the other hand, via contacts a", b", e", a conductive connection is established between the conductors A", B" and E" of the second three-lead distributor cable 6' and the appertaining contacts or contact sleeves A', B', E' or the plug-in unit 8. The connection of the three contacts a, b and e of the third contact unit 8' is then established by means of a conventional three-pole plug-in unit 8'.

The diagram in FIGS. 5 and 6 clearly show that the importance of the reduction of the cable and connection expenditure increases and the improvement of accessibility of the cabling arrangement is more apparent as the number of adjoining multi-pole contact units cabled together over a joint main cable increases. In the embodiments of FIGS. 5 and 6, each with three-pole contact units, the cable expenditure to cover the comparatively great distance between the central terminal box or similar device and this group of multi-pole contact units is reduced, for instance, from the previously required nine conductors (three individual three-lead cables) to only five leads required in this instance, i.e., the expenditure is almost halved. Correspondingly, only five connection terminals are now required in the central terminal box or in the central control or switching box from the connection of three contact units 2 to 3', instead of the previously needed nine connection terminals, since now only one (common) ground connection terminal and only one (common) safety connection terminal is now required for it. This decreases the space requirements considerably and sensibly improves the accessibility and ease of inspection of these connections.

We claim:

1. A cabling configuration for delivering at least one shared electrical signal and a plurality of independent electrical control signals from a remote central terminal station to a plurality of electrically controlled actuators, comprising, a plurality of adjoining contact units each of which is associated with a different one of said actuators, each of said contact units including at least one shared contact and at least one control contact, a multilead lead main cable leading away from said central terminal station, said main cable including at least one shared conductor carrying a corresponding shared electrical signal and a plurality of control conductors, including a first group of at least one control conductor and at least one remaining control conductor, each of said control conductors carrying one of said independent electrical control signals, first connecting means attached to said main cable for connecting each at least one shared conductor of said main cable to a corresponding shared contact of a first contact unit, and for connecting each control conductor of said first group of at least one control conductor of said main cable to a corresponding control contact of said first contact unit, a multilead distributor cable leading from said first connecting means towards one of said adjoining contact units, said distributor cable including only conductors corresponding to each at least one shared conductor for carrying a corresponding shared electrical signal and said at least one remaining control conductor carrying a separate control signal intended for said adjoining contact unit, adjoining connecting means attached to said distributor cable for connecting each at least one shared conductor of said distributor cable to a corresponding shared contact of said adjoining contact unit and for connecting said at least one remaining control conductor of said distributor cable to a corresponding control contact of said adjoining contact unit, and a plurality of adjoining connecting means, each of which connects one of said adjoining contact units to said first connecting means by a plurality of distributor cables in a branch-like fashion.

2. A cabling configuration for delivering at least one shared electrical signal and a plurality of independent electrical control signals from a remote central terminal station to a plurality of electrically controlled actuators, comprising, a plurality of adjoining contact units each of which is associated with a different one of said actuators, each of said contact units including at least one shared contact and at least one control contact, a multilead lead main cable leading away from said central terminal station, said main cable including at least one shared conductor carrying a corresponding shared electrical signal and a plurality of control conductors, including a first group of at least one control conductor and at least one remaining control conductor, each of said control conductors carrying one of said independent electrical control signals, first connecting means attached to said main cable for connecting each at least one shared conductor of said main cable to a corresponding shared contact of a first contact unit, and for connecting each control conductor of said first group of at least one control conductor of said main cable to a corresponding control contact of said first contact unit, a mulitlead distributor cable leading from said first connecting means towards one of said adjoining contact units, said distributor cable including only conductors corresponding to each at least one shared conductor for carrying a corresponding shared electrical signal and said at least one remaining control conductor carrying a separate control signal intended for said adjoining contact unit, and adjoining connecting means attached to said distributor cable for connecting each at least one shared conductor of said distributor cable to a corresponding shared contact of said adjoining contact unit and for connecting said at least one remaining control conductor of said distributor cable to a corresponding control contact of said adjoining contact unit, wherein said cabling configuration comprises a plurality of said adjoining connecting means, each of which connects one of said adjoining contact units to said first connecting means by a plurality of said distributor cables in a cascade pattern.

3. A cabling configuration for delivering at least one shared electrical signal and a plurality of independent electrical control signals from a remote central terminal station to a plurality of electrically controlled actuators, comprising, a plurality of adjoining contact units each of which is associated with a different one of said actuators, each of said contact units including at least one shared contact and at least one control contact, a multilead lead main cable leading away from said central terminal station, said main cable including at least one shared conductor carrying a corresponding shared electrical signal and a plurality of control conductors, including a first group of at least one control conductor and at least one remaining control conductor, each of said control conductors carrying one of said independent electrical control signals, first connecting means attached to said main cable for connecting each at least one shared conductor of said main cable to a corresponding shared contact of a first contact unit, and for connecting each control conductor of said first group of at least one control conductor of said main cable to a corresponding control contact of said first contact unit, a multilead distributor cable leading from said first connecting means towards one of said adjoining contact units, said distributor cable including only conductors corresponding to each at least one shared conductor for carrying a corresponding shared electrical signal and said at least one remaining control conductor carrying a separate control signal intended for said adjoining contact unit, adjoining connecting means attached to said distributor cable for connecting each at least one shared conductor of said distributor cable to a corresponding shared contact of said adjoining contact unit and for connecting said at least one remaining control conductor of said distributor cable to a corresponding control contact of said adjoining contact unit, and interconnect means disposed between said first connecting means and said first contact unit for interconnecting said first connecting means to said first contact unit, wherein said first connecting means comprises a multipole plug-in unit and said interconnect means comprises an adapter-like plug-in unit from which said distributor cable emanates.

4. A cabling configuration for delivering at least one shared electrical signal and a plurality of independent electrical control signals from a remote central terminal station to a plurality of electrically controlled actuators, comprising, a plurality of adjoining contact units each of which is associated with a different one of said actuators, each of said contact units including at least one shared contact and at least one control contact, a multilead lead main cable leading away from said central terminal station, said main cable including at least one shared conductor carrying a corresponding shared electrical signal and a plurality of control conductors, including a first group of at least one control conductor and at least one remaining control conductor, each of said control conductors carrying one of said independent electrical control signals, first connecting means attached to said main cable for connecting each at least one shared conductor of said main cable to a corresponding shared contact of a first contact unit, and for connecting each control conductor of said first group of at least one control conductor of said main cable to a corresponding control contact of said first contact unit, a multilead distributor cable leading from said first connecting means towards one of said adjoining contact units, said distributor cable including only conductors corresponding to each at least one shared conductor for carrying a corresponding shared electrical signal and said at least one remaining control conductor carrying a separate control signal intended for said adjoining contact unit, adjoining connecting means attached to said distributor cable for connecting each at least one shared conductor of said distributor cable to a corresponding shared contact of said adjoining contact unit and for connecting said at least one remaining control conductor of said distributor cable to a corresponding control contact of said adjoining contact unit, and interconnect means disposed between said first connecting means and said first contact unit for interconnecting said first connecting means to said first contact unit, wherein said first connecting means comprises a multipole plug-in unit and said interconnect means comprises an adapter-like plug-in unit from which said distributor cable emanates and wherein said multipole plug-in unit and adapter-like plug-unit are integral with each other.

5. A cabling configuration for delivering at least one shared electrical signal and a plurality of independent electrical control signals from a remote central terminal station to a plurality of electrically controlled actuators, comprising, a plurality of adjoining contact units each of which is associated with a different one of said actuators, each of said contact units including at least one shared contact and at least one control contact, a multilead lead main cable leading away from said central terminal station, said main cable including at least one shared conductor carrying a corresponding shared electrical signal and a plurality of control conductors, including a first group of at least one control conductor and at least one remaining control conductor, each of said control conductors carrying one of said independent electrical control signals, first connecting means attached to said main cable for connecting each at least one shared conductor of said main cable to a corresponding shared contact of a first contact unit, and for connecting each control conductor of said first group of at least one control conductor of said main cable to a corresponding control contact of said first contact unit, a multilead distributor cable leading from said first connecting means towards one of said adjoining contact units, said distributor cable including only conductors corresponding to each at least one shared conductor for carrying a corresponding shared electrical signal and said at least one remaining control conductor carrying a separate control signal intended for said adjoining contact unit, adjoining connecting means attached to said distributor cable for connecting each at least one shared conductor of said distributor cable to a corresponding shared contact of said adjoining contact unit and for connecting said at least one remaining control conductor of said distributor cable to a corresponding control contact of said adjoining contact unit, interconnect means disposed between said first connecting means and said first contact unit for interconnecting said first connecting means to said first contact unit, wherein said first connecting means comprises a multipole plug-in unit and said interconnect means comprises an adapter-like plug-in unit from which said distributor cable emanates, a plurality of adapter-like plug-in units connected to each other in a tower-like fashion, a plurality of distributor cables each of which emanates from one of said adapter-like plug-in units in branch-like fashion, and a plurality of adjoining connecting means, each of which connects one of said adjoining contact units to said adapter-like plug-in units by said distributor cables.

* * * * *